(12) United States Patent
Miyamura et al.

(10) Patent No.: US 12,020,731 B1
(45) Date of Patent: Jun. 25, 2024

(54) MINIMIZING HIGH RESOLUTION TAPE DIRECTORY RECOVERY TIME

(71) Applicant: International Business Machines Corporation, Armonk, NY (US)

(72) Inventors: Tsuyoshi Miyamura, Yokohama (JP); Setsuko Masuda, Toshima-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/211,279

(22) Filed: Jun. 18, 2023

(51) Int. Cl.
*G11B 5/008* (2006.01)
*G06F 3/06* (2006.01)
*G11B 27/10* (2006.01)
*G11B 15/66* (2006.01)

(52) U.S. Cl.
CPC ........ *G11B 5/00813* (2013.01); *G06F 3/0619* (2013.01); *G06F 3/0653* (2013.01); *G06F 3/0682* (2013.01); *G11B 27/107* (2013.01); *G06F 2212/213* (2013.01); *G11B 15/662* (2013.01)

(58) Field of Classification Search
None
See application file for complete search history.

(56) References Cited

U.S. PATENT DOCUMENTS

| 9,401,180 | B2 | 7/2016 | Abe et al. | |
|---|---|---|---|---|
| 11,056,140 | B1 | 7/2021 | Miyamura et al. | |
| 2014/0108720 | A1* | 4/2014 | Abe et al. | G11B 27/107 711/111 |
| 2020/0357429 | A1 | 11/2020 | Miyamura et al. | |
| 2022/0358967 | A1 | 11/2022 | Miyamura et al. | |
| 2023/0097031 | A1 | 3/2023 | Yamamoto et al. | |

* cited by examiner

*Primary Examiner* — Craig A. Renner
(74) *Attorney, Agent, or Firm* — Aaron N. Pontikos

(57) ABSTRACT

Provided is a system, method, and computer program product for minimizing high resolution tape directory (HRTD) recovery time when a HRTD is invalid. A tape drive may load a tape in the tape drive. In response to receiving a write command or a read command at a beginning of tape (BOT) position, the tape drive may execute the write command or the read command without performing HRTD recovery. In response to receiving the write command or the read command at a position other than the BOT position, the tape drive may determine if the HRTD is valid. In response to determining the HRTD is not valid, the tape drive may clear a timer.

20 Claims, 11 Drawing Sheets

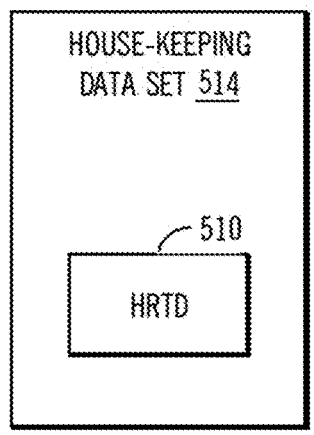
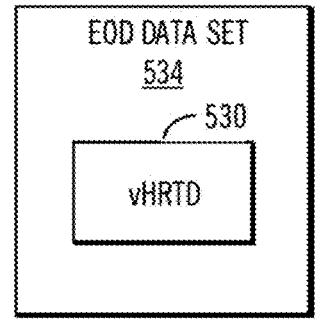
FIG. 5A  FIG. 5B
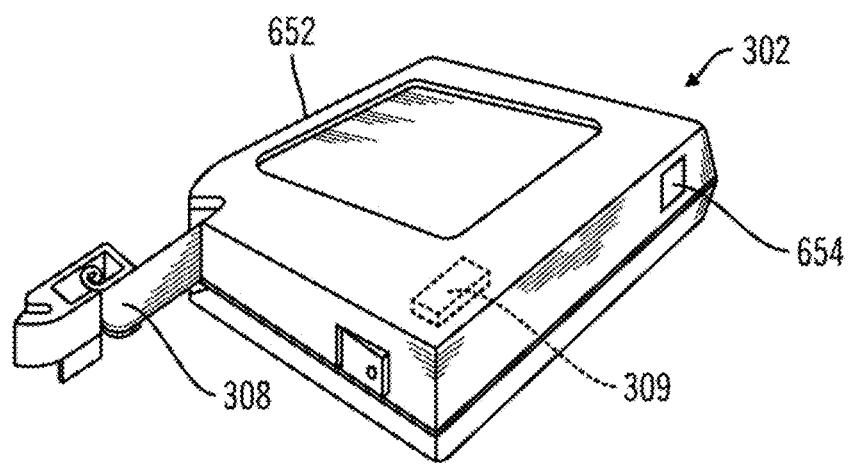
FIG. 6

MINIMIZING HIGH RESOLUTION TAPE DIRECTORY RECOVERY TIME

BACKGROUND

The present disclosure relates generally to the field of magnetic tape data storage systems, and more particularly to minimizing High Resolution Tape Directory (HRTD) recovery time when the HRTD is invalid on loading a tape.

Computer systems may include data storage systems to process and store data. Historically, data has been stored on local storage devices, such as hard disk drives (HDDs), solid state storage, and removable media such as compact discs (CDs) and digital versatile discs (DVDs). In addition, magnetic tape ("tape") data storage systems are widely used to store digital data. Tape data storage systems provide increased data storage space and longevity, for reduced costs. Modern magnetic tapes are commonly packaged in tape cartridges or cassettes. A tape appliance or a tape drive is a device that performs writing or reading of digital data from the tape.

A tape drive writes data linearly from the beginning of the tape to the end of the tape or from the end of the tape to the beginning of the tape along each wrap region which divides the tape width into multiple areas. Data records which are written by a host server are packed in a unit of data set which are recorded from the beginning of the wrap to the end of the wrap. A part of the data set records a Data Set Information Table (DSIT) which stores the information of this data set. The tape drive must move to a data position that it wants to read data or overwrite new data from the data position when the host requests to read or write new data to the tape. The process to move to the target data location is called reposition. The reposition request is made by a record number or the file mark number. The host application can specify the target record number, target file mark number, or the target record and file mark. The file mark is a delimiter of each file on the tape which contains multiple number of records. The tape drive does not know which locations the record or file mark are physically written on the tape. The tape drive utilizes a mechanism of a Tape Directory (TD) to identify the target record location roughly. The TD divides a wrap into two regions and records the last record number and file marks of the region, and the number of records and file marks recorded in the region.

One of the standards that defines tape properties is a Linear Tape Open® (LTO®) standard (Linear Tape Open and LTO and all LTO based trademarks and logos are trademarks or registered trademarks of Hewlett Packard Enterprise, IBM and Quantum and/or their affiliates). For example, in an LTO tape drive, one wrap is divided into two subareas. In such systems, the tape directory identifies which subarea of the two subareas, the target record is located. By comparison, in known tape drives such as the TS1160, TS1155, TS1150 (written as TS11xx in this disclosure) for example, which are marketed by IBM, each wrap is divided into 128 smaller subareas in the tape length direction. In such systems, in addition to the TD data structure, a High Resolution Tape Directory (HRTD) data structure identifies for each record recorded on the tape, the particular subarea of subareas, in which the target record was recorded. While LTO tape drives have a virtual High Resolution Tape Directory (vHRTD) which divides a wrap into 32 regions to store similar information as the HRTD, besides the TD.

The TS11xx tape drive stores the HRTD in a Standard Housekeeping Data Set (sHKDS) which is written on an out of user data area called a Housekeeping Data area. When a tape is unloading, the sHKDS with the HRTD is recorded on the tape. The sHKDS is read when the tape is loaded and the HRTD information is used for repositioning target data location. In addition to the sHKDS, the tape drive records the HRTD in the last written user data set called End of Data (EOD) data set.

The LTO tape drive stores the vHRTD only in EOD. Because the EOD is not always written near the beginning of the tape, the tape drive does not attempt to retrieve vHRTD by reading EOD on loading a tape. Only when the drive has chance to read EOD by the host command, it retrieves the vHRTD to utilize for repositioning target data location.

Once a TS11xx or LTO tape drive that has already retrieved the HRTD or vHRTD receives a reposition request, the drive identifies the region that includes the target record or file mark using the HRTD. As the physical location of the identified region can be determined, the drive reads each data set one by one in the region to confirm if the target record or file mark is recorded in the data set or not. If the target record or file mark is included in the data set, the repositioning is completed, otherwise, the drive keeps reading data sets until it finds the target record or file mark.

The LTO tape drive can utilize only the TD until it reads vHRTD from EOD. In this case, the drive estimates a rough location from the portion of the target record number or file mark between the first and last record number or file mark of the TD regions whose range is around 500 m (half-length of a wrap). The tape drive starts reading data sets from the position several meters before.

SUMMARY

Embodiments of the present disclosure include a system, method, and computer program product for minimizing high resolution tape directory (HRTD) recovery time when a HRTD is invalid. A tape drive may load a tape in the tape drive. In response to receiving a write command or a read command at a beginning of tape (BOT) position, the tape drive may execute the write command or the read command without performing HRTD recovery. In response to receiving the write command or the read command at a position other than the BOT position, the tape drive may determine if the HRTD is valid. In response to determining the HRTD is not valid, the tape drive may clear a timer.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 5A illustrates a known tape housekeeping data structure in which a High Resolution Tape Directory (HRTD) is recorded.

FIG. 5B illustrates a known tape End of Data (EOD) data structure in which a virtual High Resolution Tape Directory (vHRTD) is recorded.

FIG. 6 illustrates an example of a tape cartridge which may be employed in the tape storage drive apparatus of FIG. 3.

Figure 1A:
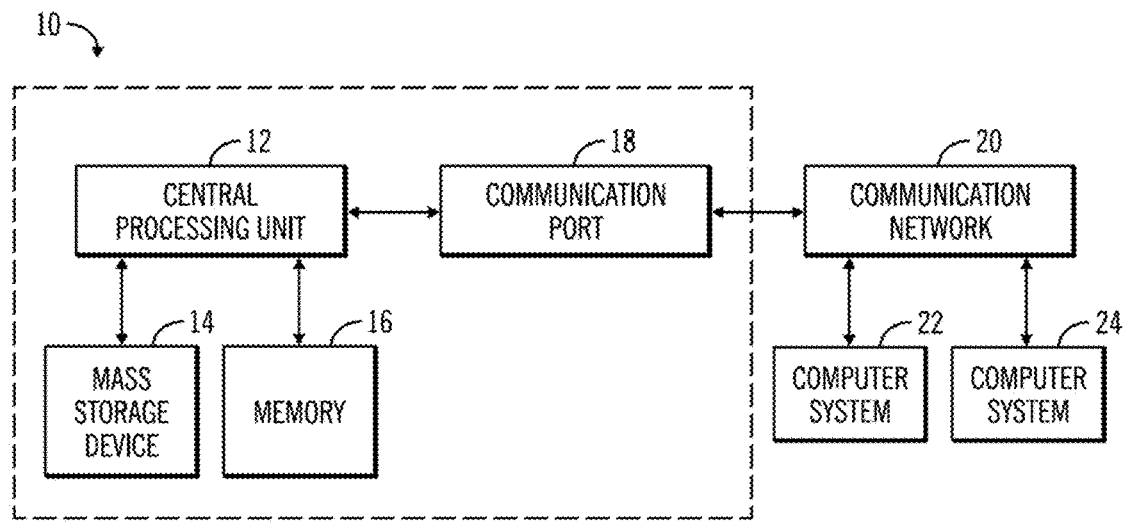
FIG. 1A illustrates an embodiment of a computing environment employing an aspect of tape reposition management in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of magnetic tape data storage systems, and more particularly to a method for minimizing HRTD recovery time when the HRTD is invalid on loading a tape. While the present disclosure is not necessarily limited to such applications, various aspects of the disclosure may be appreciated through a discussion of various examples using this context.

According to an aspect of the invention, there is provided a method for minimizing high resolution tape directory (HRTD) recovery time when a HRTD is invalid, where the method is performed by a tape drive. The method includes loading a tape in the tape drive. In response to receiving a write command or a read command at a beginning of tape (BOT) position, the tape drive executes the write command or the read command without performing HRTD recovery. In response to receiving the write command or the read command at a position other than the BOT position, the tape drive determines if the HRTD is valid. In response to determining the HRTD is not valid, the tape drive clears a timer. This is advantageous over standard HRTD recovery methods because the claimed steps reduce time loss due to repositioning to an end of data (EOD) position required for HRTD recovery.

In embodiments, the method performed by the tape drive may further include, in response to receiving the write command at the position other than the BOT position, repositioning to an end of data (EOD) position. The tape drive may read the HRTD from the EOD position. The tape drive may validate the HRTD. The tape drive may execute the write command. The is advantageous over standard HRTD recovery methods because the tape drive automatically validates the HRTD prior to executing the write command.

In embodiments, the method performed by the tape drive may further include, in response to receiving the read command at the position other than BOT position, executing the read command and setting a timer to a predetermined time limit if HRTD recovery is required after processing the read command. This is advantageous over standard HRTD recovery methods because after the read command is executed, the tape drive may set a timer to automatically implement HRTD recovery.

In embodiments, the method performed by the tape drive may further include, in response to the predetermined time limit being reached, repositioning to an end of data (EOD) position, reading the HRTD from the EOD position, and validating the HRTD. This is advantageous over standard HRTD recovery methods because after predetermined time limit is reached, the tape drive automatically implements HRTD recovery which reduces time loss due to repositioning.

In embodiments, the predetermined time limit for implementing HRTD recovery is statistically calculated. This is advantageous over standard HRTD recovery methods because they fail to implement HRTD recovery based on a statistically calculated time limit being reached.

In embodiments, the predetermined time limit for implemented HRTD recovery is set to 10 seconds. This is advantageous over standard HRTD recovery methods because they fail to include any such specific time limit for implementing HRTD recovery which was statistically calculated to reduce the most time loss.

In embodiments, the method performed by the tape drive may further include, in response to the HRTD being invalid in write mode, repositioning to an end of data (EOD) position, reading the HRTD from the EOD position, validating the HRTD, and repositioning to a target position by reading the tape. This is advantageous over standard HRTD methods because the tape drive may perform HRTD recovery despite whether a write target record exists in a segment buffer or not, where once HRTD has been recovered, the drive moves to the write target location to write data on the tape.

According to an aspect of the invention, there is provided a system for minimizing high resolution tape directory (HRTD) recovery time when a HRTD is invalid. The system may comprise a processor and a computer-readable storage medium communicatively coupled to the processor of a tape drive and storing program instructions which, when executed by the processor, cause the processor of the tape drive to perform a method. The method performed by the processer may comprise loading a tape in the tape drive. In response to receiving a write command or a read command at a beginning of tape (BOT) position, the processor may execute the write command or the read command without performing HRTD recovery. In response to receiving the write command or the read command at a position other than the BOT position, the processor may determine if the HRTD is valid. In response to determining the HRTD is not valid, the processor may clear a timer. This is advantageous over standard HRTD recovery systems because the claimed steps reduce time loss due to repositioning to an end of data (EOD) position required for HRTD recovery.

In embodiments, the method performed by the processor of the system may further include, in response to receiving the write command at the position other than the BOT position, repositioning to an end of data (EOD) position. The processor of the system may read the HRTD from the EOD position. The processor of the system may validate the HRTD. The processor of the system may execute the write command. The is advantageous over standard HRTD recovery systems because the tape drive automatically validates the HRTD prior to executing the write command.

In embodiments, the method performed by the processor of the system may further include, in response to receiving the read command at the position other than BOT position, executing the read command and setting a timer to a predetermined time limit if HRTD recovery is required after processing the read command. This is advantageous over standard HRTD recovery systems because after the read command is executed, the tape drive may set a timer to automatically implement HRTD recovery.

In embodiments, the method performed by the processor of the system may further include, in response to the predetermined time limit being reached, repositioning to an end of data (EOD) position, reading the HRTD from the EOD position, and validating the HRTD. This is advantageous over standard HRTD recovery systems because after predetermined time limit is reached, the tape drive automatically implements HRTD recovery which reduces time loss due to repositioning.

In embodiments, the predetermined time limit for implementing HRTD recovery is statistically calculated. This is advantageous over standard HRTD recovery systems because they fail to implement HRTD recovery based on a statistically calculated time limit being reached.

In embodiments, the method performed by the processor of the system may further include, in response to the HRTD being invalid in write mode, repositioning to an end of data (EOD) position, reading the HRTD from the EOD position, validating the HRTD, and repositioning to a target position by reading the tape. This is advantageous over standard HRTD systems because the tape drive may perform HRTD recovery despite whether a write target record exists in a segment buffer or not, where once HRTD has been recovered, the drive moves to the write target location to write data on the tape.

According to an aspect of the invention, there is provided a computer program product comprising a computer-readable storage medium having program instructions embodied therewith, the program instructions executable by a processor of a tape drive to cause the processor to perform a method for minimizing high resolution tape directory (HRTD) recovery time when a HRTD is invalid. The program instructions executable by the processor of the tape drive cause the processor to load a tape in the tape drive. In response to receiving a write command or a read command at a beginning of tape (BOT) position, the program instructions cause the processor to execute the write command or the read command without performing HRTD recovery. In response to receiving the write command or the read command at a position other than the BOT position, the program instructions cause the processor to determine if the HRTD is valid. In response to determining the HRTD is not valid, the program instructions cause the processor to clear a timer. This is advantageous over standard HRTD recovery computer program products because the claimed steps reduce time loss due to repositioning to an end of data (EOD) position required for HRTD recovery.

In embodiments, the program instructions executable by the processor of the tape drive may further include instructions to cause the processor to, in response to receiving the write command at the position other than the BOT position, reposition to an end of data (EOD) position, read the HRTD from the EOD position, validate the HRTD, and execute the write command. The is advantageous over standard HRTD recovery computer program products because the tape drive automatically validates the HRTD prior to executing the write command.

In embodiments, the program instructions executable by the processor of the tape drive may further include instructions to, in response to receiving the read command at the position other than BOT position, execute the read command and set a timer to a predetermined time limit if HRTD recovery is required after processing the read command. This is advantageous over standard HRTD recovery computer program products because after the read command is executed, the tape drive may set a timer to automatically implement HRTD recovery.

In embodiments, the program instructions executable by the processor of the tape drive may further include instructions to, in response to the predetermined time limit being reached, reposition to an end of data (EOD) position, read the HRTD from the EOD position, and validate the HRTD. This is advantageous over standard HRTD recovery computer program products because after predetermined time limit is reached, the tape drive automatically implements HRTD recovery which reduces time loss due to repositioning.

In embodiments, the predetermined time limit for implementing HRTD recovery is statistically calculated. This is advantageous over standard HRTD recovery computer program products because they fail to implement HRTD recovery based on a statistically calculated time limit being reached.

In embodiments, the program instructions executable by the processor of the tape drive may further include instructions to, in response to the HRTD being invalid in write mode, reposition to an end of data (EOD) position, read the HRTD from the EOD position, validate the HRTD, and reposition to a target position by reading the tape. This is advantageous over standard HRTD computer program products because the tape drive may perform HRTD recovery despite whether a write target record exists in a segment buffer or not, where once HRTD has been recovered, the drive moves to the write target location to write data on the tape.

As described above, the TS11xx tape drive retrieves HRTD by reading sHKDS from the location near the beginning of the tape when the tape is loaded. The location at the beginning of the tape medium is the place that the drive head runs more times than other locations and can be worn out. The data sets around the beginning of the tape sometimes cannot be read back by one attempt. The tape drive attempts to read the user data set until it can be read by changing the tape drive's settings. The number of read retries reaches around 80 times at most. Regardless of these retries, if the drive cannot read the data set, it reports read error to the host at the end. On the other hand, the tape drive does not read retry the sHKDS because it does not have any user data and the user demanded that the tape should be loaded as soon as possible. Instead of the retries, the TS11xx tape drive attempts to recover HRTD by moving to the location of EOD to read it when the first reposition command such as Locate or Space is issued by the host. This is because it is not necessary to recover HRTD when new data is written from the beginning of the tape (BOT) position or when the host starts reading data from BOT.

The LTO tape drive does not have a mechanism that proactively moves to the location of EOD to retrieve the vHRTD from the EOD position. Rather, the drive recovers the vHRTD only when the drive has opportunity to read the EOD. The drive positions the target record or file mark from the proportion between the first and last record or file mark of the TD region.

When the HRTD is unreadable from the sHKDS or otherwise determined to be invalid, time loss may occur when the tape drive is required to navigate to the EOD location in order to recover the HRTD. Assessment of both recovery time of HRTD and vHRTD has shown that improvement in reducing the time loss may be obtained which results in improving tape drive efficiency.

Tape drive performance was measured for both LTO and TS11xx tape drives in order to identify issues related to HRTD recovery time. Experimental testing using an LTO-7 tape drive without a vHRTD shows that the tape drive moves at the fastest speed to the location 4 meters ahead of the HRTD boundary which the tape drive estimated by the proportion of the target record between the beginning and end of the TD range. Next, the tape drive reads each data set one by one using normal speed until it finds the data set that includes the target record. The experiment revealed that the LTO7 tape drive moved at the fastest speed to the location of every 5251 longitudinal position counter (LPOS) (28.73 meters) which correspond to the interval of each HRTD boundary. As the normal tape speed of an LTO9 drive is 5.6 m/s, the travel time from the location 4 meters ahead of the HRTD boundary to the HRTD boundary is 4 m/5.6(m/s) =0.714 s, and the travel time from an HRTD boundary to the next HRTD boundary is 28.73 m/5.6 (m/sec)=5.13 s. As the target record exists at an arbitrary location within the HRTD region, it takes 0.714 s+5.13 s/2=3.28 s to reach the target location on average.

The TX11xx tape drive utilizes HRTD, which divides the length of a wrap into 128 regions, to move to the target location. Assuming the tape length is 1024 meters, then the length of each region is 8 meters. After moving to the boundary of an HRTD region in fast speed, then repositioning to the target location at a normal speed of 5.6 m/s, the head travels in 8 m/5.6 (m/sec)=1.43 s from one side of the HRTD region to the other. Therefore, the tape drive reaches the target in 0.71 s on average. For statistical calculation purposes, let 0.71 s be set as the variable $\beta$.

The average travel time from a certain location of the tape to the boundary of a HRTD region is the same between the LTO and TS11xx tape drives. The saving travel time by the HRTD comparing to the method using proportion on LTO without vHRTD can be estimated as 3.28 s−0.71 s=2.57 s. Here, let 2.57 s be set as the variable $\alpha$.

The TS11xx tape drive recovers the HRTD by travelling to the EOD when a first reposition command (locate/space) is issued by the host if the drive could not retrieve HRTD on loading the tape. Here, the travel time from the beginning of the tape to the EOD which is located at arbitrary position on the tape is calculated.

The drive travel to the boundary of HRTD region at the highest speed 12.4 m/s. Here, let its speed be set as the variable v and the tape length be set as the variable p, wherein the high-speed traveling time from the beginning of the tape to the end of the tape is shown as: w=p/v The average traveling time to the EOD which is located at an arbitrary location becomes w/2. As the HRTD is not retrieved yet, $\alpha+\beta$ is added. The average travel time from the EOD to a data set which stores the target record at the arbitrary location becomes w/3. In this case, as HRTD has been retrieved at EOD, only beta is added.

Therefore, the average travel time from the beginning of the tape to the target location via EOD takes w/2+w/3+$\alpha$+2$\beta$. Comparing with the case that the tape drive moves from the beginning of the tape to the target record location directly, which takes w/2+$\alpha$+$\beta$, the travel time to the target record after recovering the HRTD takes w/3+ß extra time.

Assuming that the tape length is 1024 meters, the travel time to the target after recovering the HRTD takes: w/3+$\beta$= (1024/12.4)/3+0.71=28.21 s. This means, the tape drive spends an extra 28.21 seconds to recover the HRTD to shorten $\alpha$=2.57 seconds per each reposition. For example, 28.21 s/2.57 s=10.98 which means that it is worth recovering the HRTD if reposition is executed more than 10 times. Considering the effect of recovering the HRTD with the time to recover the HRTD, this disclosure rebuilds the HRTD recovery procedure. Further, this procedure or a substantially similar procedure may be applied in an LTO tape drive to recover the vHRTD.

Embodiments of the present disclosure include a system, method, and computer program product that reduce the time loss due to navigation/repositioning to the location of EOD to recover the HRTD. In embodiments, when it is necessary to recovery HRTD (e.g., sHKDS is not readable), in order to reduce the time loss from repositioning the tape drive to EOD to recover the HRTD, the tape drive recovers the HRTD using following procedure. The tape drive does not recover the HRTD until tape motion command is issued by the host. For example, if a read or a write command is issued at BOT, the drive processes the command. If reposition command is issued, the drive moves to the target position.

In embodiments, if write command is issued when the current location is not at the BOT position and HRTD recovery is required, the drive attempts to recover the HRTD before writing data on the tape. If a read command is issued when the current location is not at the BOT position, then the tape drive processes the read command.

In embodiment, the tape drive sets a timer if HRTD recovery is required after processing the read command. Further, the tape drive resets the timer when the next read command is issued, so that once the timer expires, the tape drive automatically attempts to recover the HRTD.

In embodiments, if the tape drive determines that HRTD recovery is required when a write command is issued, the tape drive moves to the EOD location to read EOD so that the HRTD is recovered despite whether the write target record exists in a segment buffer or not. After recovering HRTD, the drive moves to the write target location to write data on the tape.

The aforementioned advantages are example advantages, and not all advantages are discussed. Furthermore, embodiments of the present disclosure can exist that contain all, some, or none of the aforementioned advantages while remaining within the spirit and scope of the present disclosure.

Various aspects of the present disclosure are described below with reference to flowchart illustrations and/or block diagrams of methods, apparatus (system) and computer program products. Turning to FIG. 1A, an example of a computer system 10 is depicted in which aspects of an embodiment of the present disclosure may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). In the illustrated embodiment, the mass storage devices 14 include a tape data storage system.

Memory device 16 may include such memory as random-access memory (RAM), electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10.

Figure 1B:
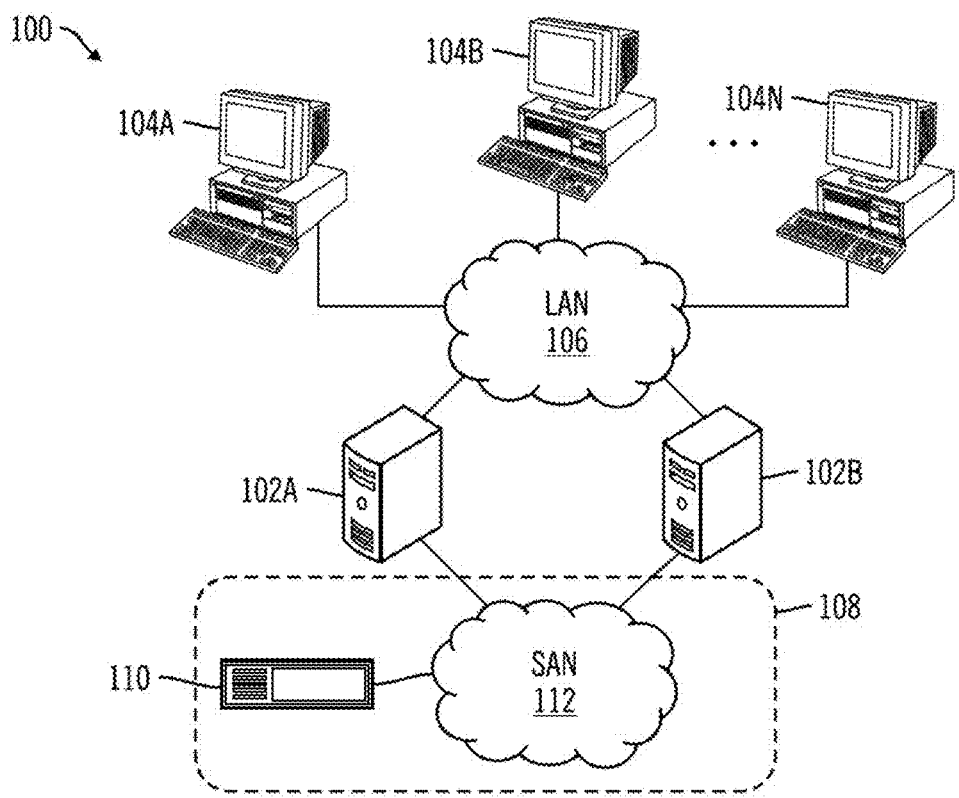
FIG. 1B illustrates a high-level block-diagram representation of an enterprise computer system including a tape storage drive apparatus in which tape reposition management in accordance with the present disclosure may be employed.

FIG. 1B is a high-level block-diagram showing a representation of an enterprise computer system including a tape data storage system in which aspects of an embodiment of the present disclosure may be realized. Examples of enterprise-wide applications include, without limitation, payroll, warehouse, transportation, and batch jobs. Enterprise computer system 100 of FIG. 1B comprises a number of host data processing systems (e.g., server data processing systems 102A, 102B and associated client data processing systems 104A, 104B . . . 104N), which are communicatively coupled together via a first network interconnect (e.g., local area network or "LAN" interconnect 106) as shown. Server data processing systems 102A, 102B of the depicted embodiment are further coupled to a storage subsystem 108 including a number of data storage devices and a second network interconnect (e.g., storage area network or "SAN" interconnect 112). One or more of the server data processing systems 102A, 102B, client data processing systems 104A, 104B . . . 104N, and storage system 108 may be configured for reposition management in accordance with the present disclosure.

In the exemplary embodiment of FIG. 1B, storage system 108 is depicted as including tape data storage system as represented by the tape data storage system 110. In alternative embodiments, storage system 108 may further include any number and type of data storage devices (e.g., individual disk drives, tape drives, disk arrays, tape arrays, RAID array subsystems, robotic tape libraries, filers, file servers) communicatively coupled together and to server data processing systems 102A, 12B via a storage interconnect (SAN interconnect 112), such as a fiber channel (FC) switch, switch fabric, arbitrated loop, or the like. Server data processing system 102A of the embodiment of FIG. 1 comprises an application server (e.g., a database server) to provide core operational functionality to one or more of client data processing systems 104A-104N (where "N" is a positive integer) and server data processing system 102B comprises another server (e.g., a cluster failover server, load-balancing server, backup server, or the like).

Tape data storage system 110 of the depicted embodiment is coupled to SAN interconnect 112 via a communication link as shown. Each communication link may comprise any of a number of communication media capable of transmitting one or more electrical, optical, and/or acoustical propagated signals (e.g., copper wiring, fiber optic cable, or the like) between SAN interconnect 112 and a communication port of tape data storage system 110.

In the illustrated embodiment, one or both of the tape data storage system 110 and server data processing system 102A are configured with sufficient functionality to employ tape reposition management in accordance with the present disclosure, to control and/or manage the tape repositioning and access provided to data of a tape data storage medium within a tape cartridge coupled with tape data storage device 110 as will be further described herein. However, it is appreciated that one or more of the computer systems 10, 22, 23 (FIG. 1A), server data processing systems 102A, 102B (FIG. 1B), client data processing systems 104a, 104b . . . 104n, and data storage system 108, may be configured to employ reposition management in accordance with the present disclosure.

While a conventional SAN-type interconnect (SAN interconnect 112) has been specifically depicted in the embodiment of FIG. 1, other interconnects (e.g., direct connection, local, metropolitan, and/or wide-area networks) and other protocols (e.g., FICON, ESCON, SSA, or the like) may be utilized. Moreover, while a particular number and arrangement of elements have been illustrated with respect to enterprise 100 of FIG. 1B, it should be appreciated that embodiments of the present disclosure are not limited to enterprises, systems, or data storage devices having any particular number, type, or arrangement of components and so may encompass a wide variety of system types, architectures, and form factors.

Figure 2:
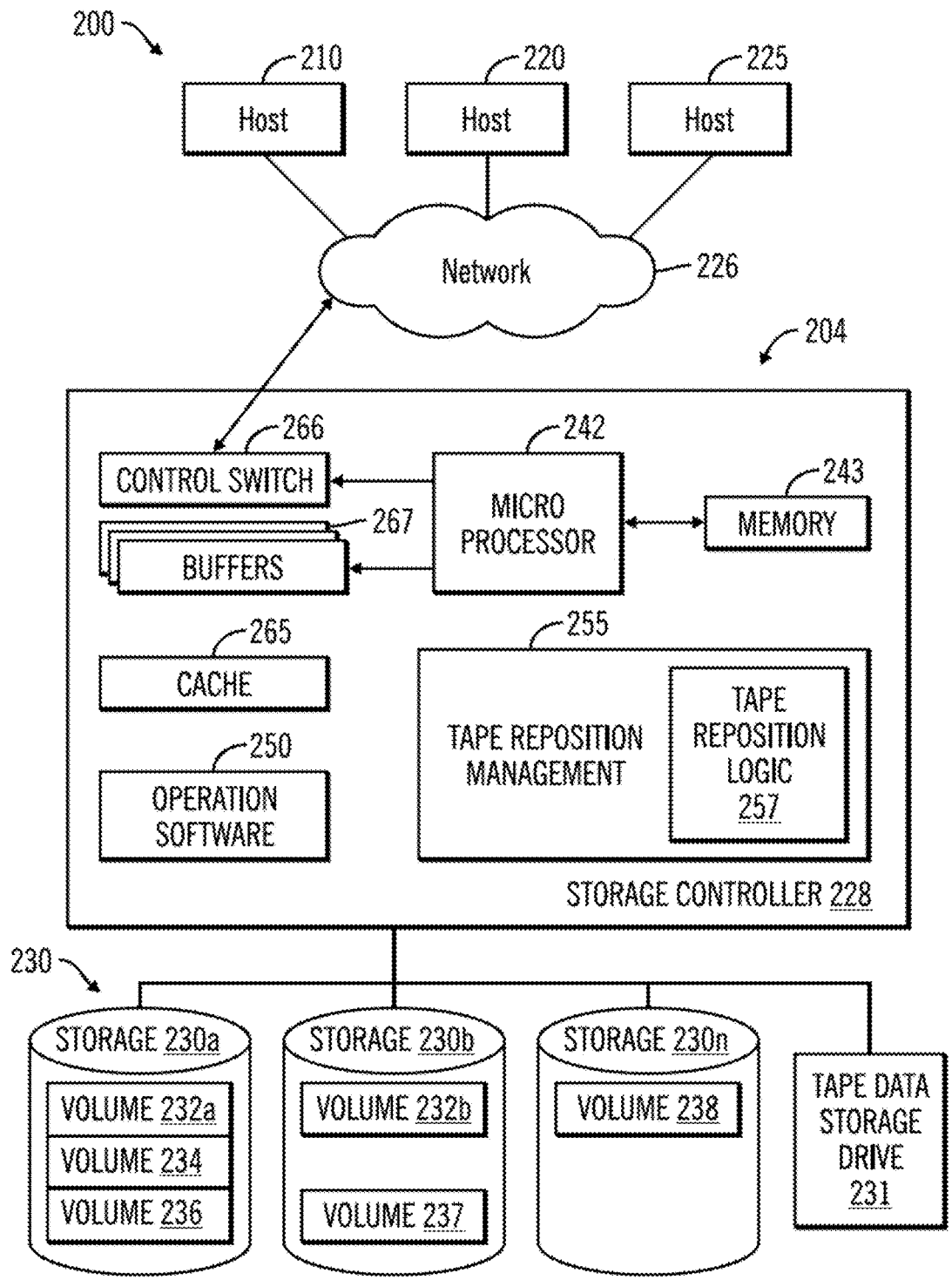
FIG. 2 illustrates an exemplary block diagram of a hardware and software structure of a data storage system in a computer system in which tape reposition management in accordance with the present disclosure may be employed.

In an alternative embodiment, FIG. 2 is an exemplary computer system 200 showing a hardware and software structure of a data storage system 204 in which aspects of tape reposition management in accordance with the present disclosure may be realized. Host computers 210, 220, 225, are shown, each acting as a central processing unit for performing data processing as part of the computer system 200 which includes a data storage system 204. The hosts (physical or virtual devices), 210, 220, and 225 may be one or more physical devices or logical devices to accomplish the purposes of an embodiment of the present disclosure. In one embodiment, by way of example only, a data storage system 204 may be implemented as IBM® System Storage™ DS8000™ which has been modified to employ tape reposition management in accordance with the present disclosure.

A Network connection 226 may be a fiber channel fabric, a fiber channel point to point link, a fiber channel over ethernet fabric or point to point link, a FICON or ESCON I/O interface, any other I/O interface type, a wireless network, a wired network, a LAN, a WAN, heterogeneous, homogeneous, public (i.e., the Internet), private, or any combination thereof. The hosts, 210, 220, and 225 may be local or distributed among one or more locations and may be equipped with any type of fabric (or fabric channel) (not shown in FIG. 2) or network adapter to the storage controller 228, such as Fibre channel, FICON, ESCON, Ethernet, fiber optic, wireless, or coaxial adapters. Data storage system 204 is accordingly equipped with a suitable fabric (not shown in FIG. 2) or network to communicate. Data storage system 204 is depicted in FIG. 2 comprising storage controller 228, and storage 230 including tape data storage drive 231 controlled by the storage controller 228.

Storage 230a, 230b . . . 230n of storage 230 may be physically comprised of one or more storage devices, such as storage arrays. A storage array is a logical grouping of individual storage devices, such as a hard disk or a tape data storage drive. In certain embodiments, one or more of storage 230a, 230b . . . 230n is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request. Moreover, the tape data storage device 110 (see FIG. 1B), as described in FIG. 1B and FIG. 3, may be implemented with the architecture described in FIG. 2.

In one embodiment, by way of example only, the storage system as shown in FIG. 2 may include a logical volume, or simply "volume," and may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b and a full volume 237. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

To facilitate a clearer understanding of aspects of the present disclosure, storage controller 228 is shown in FIG. 2 as a single processing unit, including a microprocessor 242, system memory 243 which may include nonvolatile storage ("NVS") described in more detail below. It is noted that in some embodiments, storage controller 228 is comprised of multiple processing units, each with their own processor complex and system memory, and interconnected by a dedicated network within data storage system 204. In some embodiments, the devices included in storage 230 may be connected in a loop architecture.

Storage controller 228 manages storage 230 and facilitates the processing of write and read requests intended for storage 230. The system memory 243 of storage controller 228 stores program instructions and data, which the processor 242 may access for executing functions and methods of an embodiment of the present disclosure for executing and managing storage 230 as described herein. In one embodiment, system memory 243 includes, in association with, or in communication with the operation software 250, tape reposition management 255 for performing methods and operations employing reposition management in accordance with the present disclosure. One aspect of the tape reposition management 255 is to control tape reposition logic 257 which controls the position of the tape of a tape data storage drive 231 FIG. 3). Although the tape reposition logic 257 is depicted as a component of the tape reposition management 255, it is appreciated that the tape reposition logic 257 may be located in other components of the system such as one or more of the storage controller 228, a host 210-225, network 226, and tape storage drive 231. In a similar manner, although the logic of the tape management 255 is depicted as a component of the storage controller 228, it is appreciated that the tape reposition management 255 may be located in other components of the system such as one or more of the tape storage drive 231, a host 210-225, and a network 226. Thus, tape reposition management 255 may be implemented with one or more of hardware, software, and firmware, alone or in combination.

As shown in FIG. 2, system memory 243 may also include or be in communication with a cache 265 for storage 230, also referred to herein as a "cache memory", for buffering "write data" and "read data", which respectively refer to write/read requests and their associated data. In one embodiment, cache 265 is allocated in a device external to system memory 243, yet remains accessible by microprocessor 242 and may serve to provide additional security against data loss, in addition to carrying out the operations as described in herein.

In some embodiments, cache 265 is implemented with a volatile memory and nonvolatile memory and coupled to microprocessor 242 via a local bus (not shown in FIG. 2) for enhanced performance of data storage system 200. An NVS portion of the memory 243 included in data storage controller is accessible by microprocessor 242 and serves to provide additional support for operations and execution of an embodiment of the present disclosure as described in other figures. The NVS may also referred to as a "persistent" cache, or "cache memory" and is implemented with nonvolatile memory that may or may not utilize external power to retain data stored therein. The NVS may be stored in and with the cache 265 for any purposes suited to accomplish the objectives of an embodiment of the present disclosure. In some embodiments, a backup power source (not shown in FIG. 2), such as a battery, supplies NVS with sufficient power to retain the data stored therein in case of power loss to data storage system 200. In certain embodiments, the capacity of NVS is less than or equal to the total capacity of cache 265.

The storage controller 228 includes a control switch 266 for controlling the communication protocol such as a fiber channel protocol, for example, to the host computers 210, 220, 225. Buffers 267 assist the cache 265 in temporarily storing (buffering) read and write data.

Figure 3:
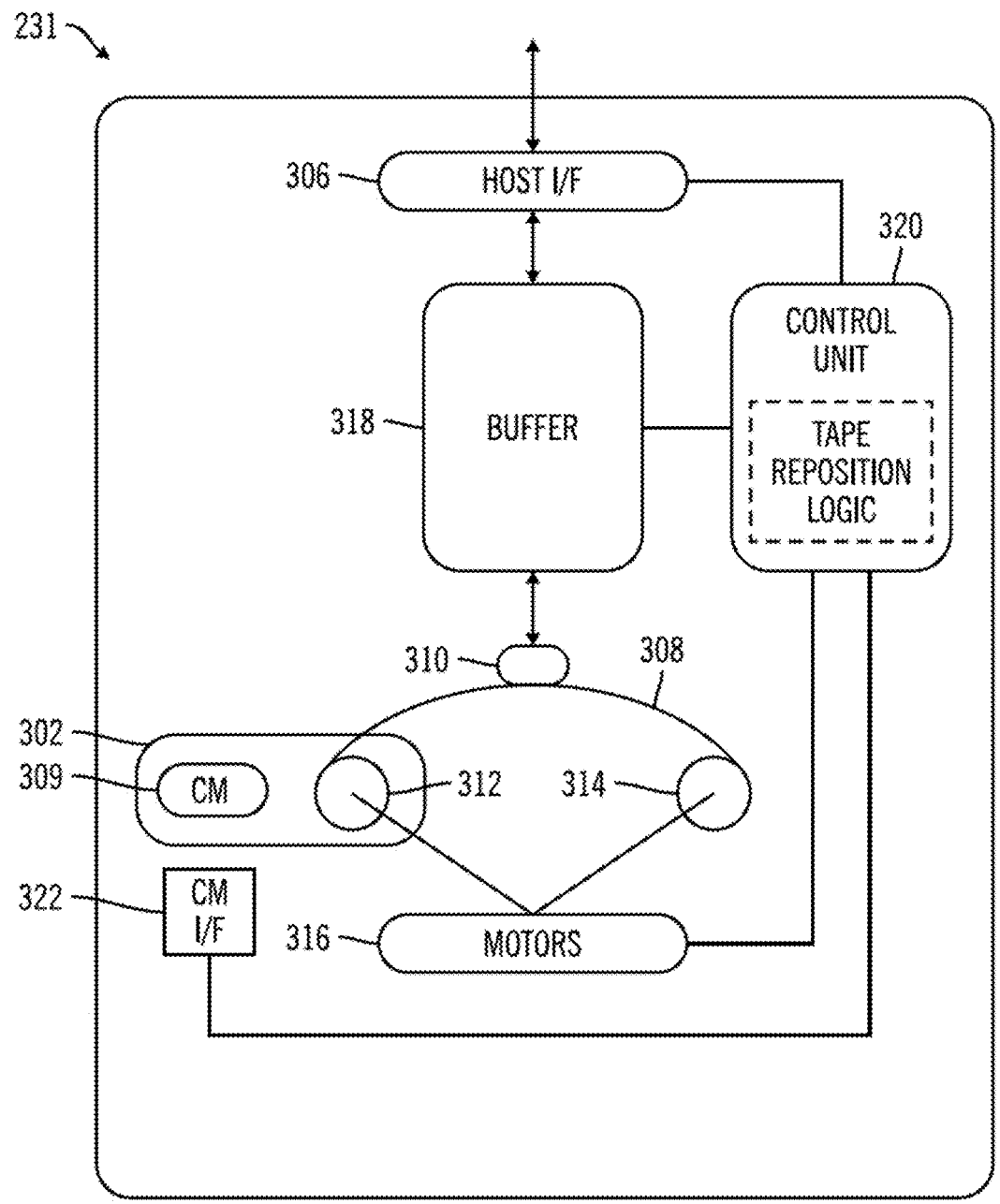
FIG. 3 illustrates an exemplary block diagram of a tape storage drive apparatus in which tape reposition management in accordance with the present disclosure may be employed.

FIG. 3 is a block diagram depicting one embodiment of a tape data storage drive 231 in which aspects of tape reposition management in accordance with the present disclosure may be employed. The tape data storage drive 231 comprises a removable data storage tape cartridge 302 and a communication interface (e.g., host data processing system interface (I/F) 306) to communicatively couple tape data storage drive 231 to the storage controller 228 (FIG. 2) or alternatively, one or more host data processing systems or associated communication channels (e.g., SAN interconnect 112).

The communication I/F 306 is configured to receive input/output (I/O) operation requests (e.g., "read" and/or "write" requests), and process such requests in an appropriate manner to control or "manage" access to a tape data storage medium 308 (e.g., magnetic tape) of removable data storage tape cartridge 302 as described herein. In addition to tape data storage medium 308, data storage tape cartridge 302 comprises a cartridge memory (CM) module 309 which in one embodiment, includes a passive, contactless silicon storage device utilized to store data about the tape cartridge 302 in which it resides. Exemplary data may include, for example, data indicating the associated tape cartridge's volume serial number (VOLSER), the "type" of data storage medium within the cartridge, data format type and the data, if any, which is stored thereon.

Tape data storage medium 308 of removable data storage tape cartridge 302 is routed in proximity to a tape access (e.g., read/write) head 310 utilizing media transport reels 312 and 314 and one or more media transport motors 316 as shown. The tape access head 310 is configured to read data from and write data to tape data storage medium 308 and to temporarily store or "stage" such data within a buffer 318 (e.g., one or more "read-ahead" or staging buffers).

When writing data on a tape 308 (FIG. 3) or reading data from a tape 308, the tape 308 is moved relative to the read/write head 310 to the position of the data to be written or read in advance. The process of moving to the target data position is typically referred to as a "reposition" process and is performed in response to a reposition request issued by a storage controller.

In an example embodiment, tape cartridge 302 meets the standard specifications of one or more of a TS11xx tape drive such as, for example, the TS1160 or a LTO generation standard such as, for example, the LTO-7 tape drive. In such an embodiment, supply reel 312 may be a part of the tape cartridge and connected to beginning of the tape 308, and the end of tape 308 is connected to a leader pin (not shown) which is mechanically grasped by features (not shown) of tape data storage drive 231 and threaded onto take-up reel 314.

A control unit 320 includes read logic and write logic for reading data from and writing data to the tape of the tape storage drive. Thus, the control unit 320 controls and manages data flow, formatting, and data storage subsystem operation via control signals issued to one or more of communication I/F 306, buffer 318, media transport motors 316, and/or CM I/F 322 utilized to access (read or write) data stored in CM 309.

In the illustrated embodiment some or all of the functions of the tape reposition logic 257 (FIG. 2) may be located within the control unit 320 of the tape storage drive 231. In another embodiment, such control functionality may be incorporated into one or more of other components of the tape data storage drive 231. In a similar manner, although the control unit 320 is depicted in FIG. 3 as a part of a tape storage drive 231, it is appreciated that logic of the control unit may be located in one or more of various components of the system such as one or more of the storage controller 228, a host 210-225, and network 226, as well as the tape storage drive 231. Alternatively, some or all of the component functions may be implemented in hardware devices, such as in Application Specific Integrated Circuits (ASICs), Field Programmable Gate Array (FPGA) or executed by separate dedicated processors.

The memory 243 may comprise one or more memory devices volatile or non-volatile, such as a Dynamic Random Access Memory (DRAM), a phase change memory (PCM), Magneto resistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc.

The storage 108 may comprise different types or classes of storage devices of the SAN 112, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in the storage 108 may further be configured from an array of devices, such as Just a Bunch of Disks (JBOD), Direct Access Storage Device (DASD), Redundant Array of Independent Disks (RAID) array, virtualization device, etc. Further, the storage 108 may comprise heterogeneous storage devices from different vendors and different types of storage devices, such as a first type of storage devices, e.g., hard disk drives, that have a slower data transfer rate than a second type of storage devices, e.g., SSDs.

The storage 108 may comprise a cloud storage system provided by a cloud storage service provider. Examples of cloud storage service providers include DropBox®, Google® Drive, Amazon Cloud Drive®, Amazon® S3, IBM® Cloud Object Storage System™, etc. (Dropbox is a registered trademark of Dropbox, Inc., Google is a registered trademark of Google, Inc., Amazon and Amazon Cloud Drive are trademarks of Amazon Technologies, Inc.; and IBM and Cloud Object Storage System are trademarks of IBM throughout the world).

The network 106 may include, without limitation, a Storage Area Network (SAN), Local Area Network (LAN), Intranet, the Internet, Wide Area Network (WAN), peer-to-peer network, wireless network, and arbitrated loop network. Accordingly, the enterprise computer system 100 includes a storage system 108 coupled to a server 102 through a network 112.

Figure 4:
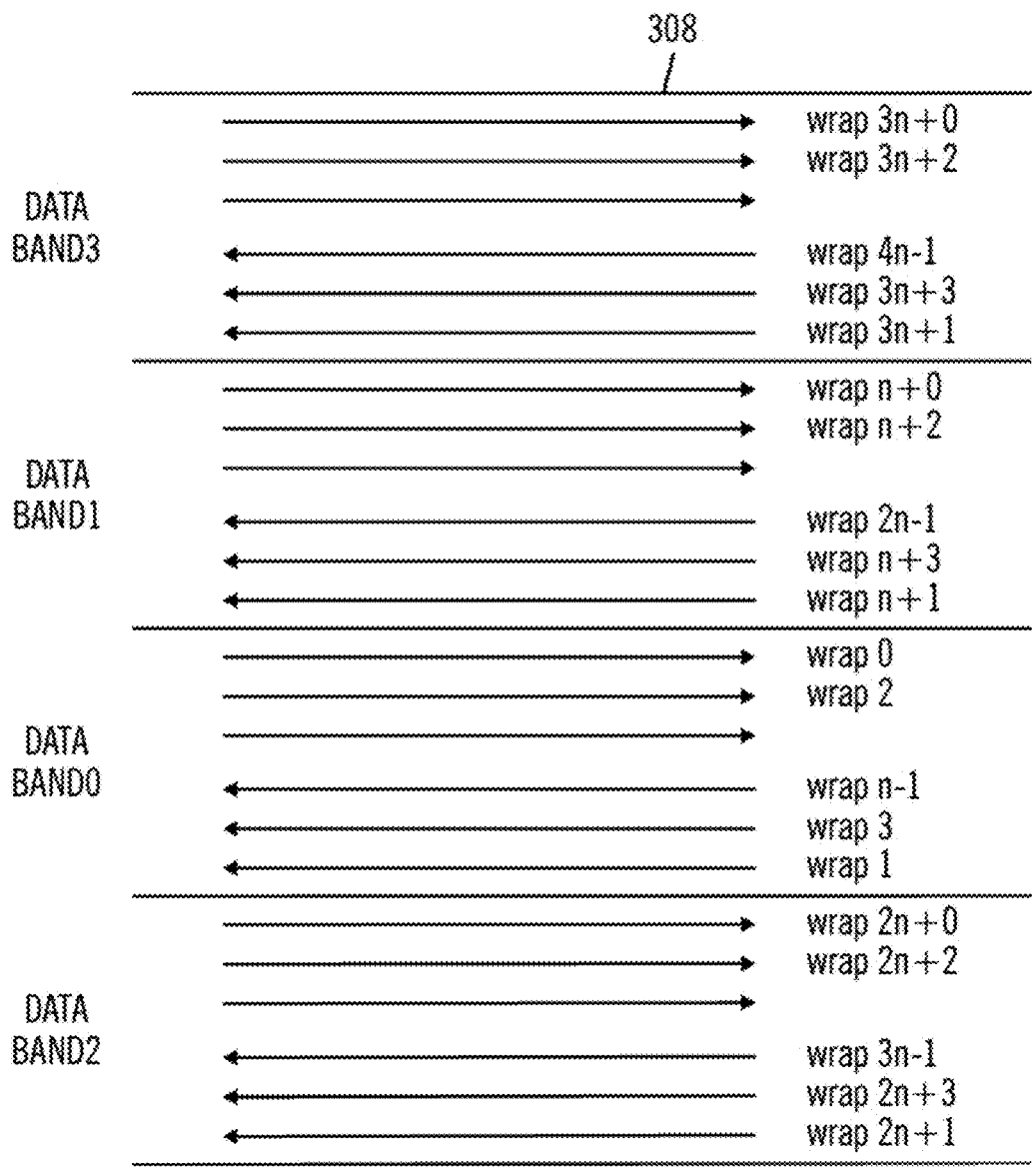
FIG. 4 illustrates a known band structure of a tape in a tape storage drive system.

In the illustrated embodiment, the tape data storage drive 231 is a linear system in which the width direction of the tape is divided into a plurality of areas (wraps) in a conventional manner as shown in FIG. 4. The data is recorded from the beginning to the end and from the end to the beginning of the tape in the tape length direction represented by an arrow for each wrap. The width of the area in the tape width direction in which valid data for each wrap is written is called a track width (track pitch Wtp). As shown in FIG. 4, recording is performed on the track while traveling from the beginning to the end (forward) in the even wrap, and recording is performed while traveling from the end to the beginning (backward) in the odd wrap. In one known tape standard, a HRTD (High Resolution Tape Directory) data structure 510 (FIG. 5A) is stored in a tape portion called the House Keeping data set 514 defined before the first user data area of the tape and is read when the tape is loaded.

For example, an LTFS magnetic tape medium wrap allocation in accordance with the LTO-7, standard, a magnetic tape may have 112 wraps allocated to four data bands, (data band0-band3) where each band has 28 wraps, that is, data band0 has 28 wraps $wrap_0$-$wrap_{n-1}$, data band1 has 28 wraps $wrap_{n+0}$-$wrap_{2n-1}$, data band2 has 28 wraps $wrap_{2n+0}$-$wrap_{3n-1}$, and data band3 has 28 wraps $wrap_{3n+0}$-$wrap_{4+n-1}$. All the data wraps may be formatted into a single partition from wrap 0 to wrap 111 or for example, other formats may be used, depending upon the particular applications. For example, one known LTFS standard may divide the tape into two partitions in which a first partition includes wraps 0-1 that may be used for metadata and a second partition includes wraps 4-111 for data retention associated with the metadata. For example, an LTFS typically creates a 2-partition tape when formatting the tape. Wrap 0 and wrap 1 are used to provide an Index Partition. Wrap 2 and wrap 3 are typically used as guard bands. From wrap 4 to the last wrap, a Data Partition is provided for storing user data which may be constructed with standard records of the tape drive system.

FIG. 6 illustrates an example embodiment of a tape cartridge 302 suitable for use with a tape data storage systems such as tape data storage drive 231 shown in FIG. 3. According to an example embodiment, tape cartridge 302 includes housing 652, magnetic tape medium 308 ("tape") in housing 652, and cartridge memory 309 coupled to housing 652. In other embodiments, cartridge memory 309 may be embedded inside housing 652. In further embodiments, cartridge memory 309 may be attached to the inside or outside of housing 652 without modification of housing 652. The cartridge 302 may also have identifying indicia 654 in or on the housing 652.

According to an example embodiment, controller 320 (FIG. 3) uses cartridge memory 309, via cartridge memory reader or interface 322, as a temporary storage for information about data that is to be written in both running directions of magnetic tape medium 308, such as a generation value of LTFS indexes. In further embodiments, cartridge memory 309 may store information regarding tape partitioning, and other information regarding using of the magnetic tape medium 308 such as a tape directory (TD) for example.

In known tape data storage drive systems, a tape reposition request identifies a target location which is identified by a record number of a target record, or a file mark number of a target file mark. A file mark is a data structure which delimits an area or subarea of a file which is composed of an arbitrary number of records. However, the precise location of each file mark is typically not available to the storage controller or the tape data storage drive. Typically, read logic in a tape drive storage system does not know precisely where the target record or file mark is written on the tape. Instead, a data structure often referred to as a "Tape Directory (TD)" is frequently used to determine which general area of the tape the target record is located.

For example, in an LTO tape drive, one wrap is divided into two subareas. In such systems, the tape directory identifies which subarea of the two subareas, the target record is located. By comparison, in known tape drives such as the TS1160 for example, which is marketed by IBM, each wrap is divided into 128 smaller subareas in the tape length direction. In such systems, in addition to the TD data structure, a High Resolution Tape Directory (HRTD) data structure 510 (FIG. 5A) identifies for each record recorded on the tape, the particular subarea of the 128 subareas, in which the target record was recorded. As previously noted, the HRTD (High Resolution Tape Directory) data structure 510 (FIG. 5A) is stored in a tape data portion called the Housekeeping data set 514.

Thus, in known systems having HRTD type directories, upon receiving a reposition request to reposition the tape to read a specified target record, the HRTD data structure is examined to identify which particular subarea of the possible 128 subarea, contains the specified target record number or file mark number. In known tape drive systems, the physical location of each HRTD subarea of the tape is known to tape reposition logic. Accordingly, the tape is repositioned by the tape reposition logic to the particular subarea identified by the HRTD data structure. Read logic of the tape drive system then searches records of the data set located in the area in order from the beginning of the area.

Records stored in each area or subarea of the tape are often collectively referred to as a data set. Known tape drive systems utilize a Data Set Information Table (DSIT) which identifies the number of records in the data set which occupies an area of subarea of the tape. The number of file marks in a particular data set is also known as is the file mark number of the file mark at the beginning of the data set. Using the target record number of the specified target record of the target data set, the number of records recorded in the target data set as indicated in the DSIT, and the first file mark number and the number of file marks in the target data set, read logic of a known tape drive can check if the target record is to be found in the target data set. Once the desired record is confirmed to be in the data set being checked, the reposition request is terminated. Accordingly, reading of the data set or data sets is continued until a data set including the desired record is found.

It is appreciated that in tape drive systems which utilize an HRTD data structure in the housekeeping data set of the tape, a specified record may be relatively quickly located since each tape wrap is subdivided into relatively small subareas and the HRTD data structure identifies the records in each such subarea. Thus, a search of a relatively small subarea for a specified record may be completed quickly. On the other hand, the specifications of an LTO tape drive may be defined by a different standard. As a result, a data set such as an HRTD data structure generally cannot be written in the housekeeping data set in known LTO tape drives. To address this issue, known LTO tape drives marketed by IBM create information which is the same or similar to that found in an HRTD data structure. This HRTD type information is recorded as a virtual HRTD (vHRTD) in the free space of a data set called End of Data (EOD) which is typically written last in a data write to the tape. FIG. 5B shows an example of a known vHRTD 530 recorded in an EOD data set 534 of a data partition described below.

However, in known tape drive systems, the EOD data set is not read when the tape is loaded and mounted. As a result, the vHRTD is not read in connection with loading and mounting a tape and thus is not available to facilitate application requested read operations following loading and mounting of a tape. Consequently, tape access operations in response to application access requests received after loading and mounting of the tape do not utilize the vHRTD directory for an interval of time following completion of loading and mounting of the tape. However, it is appreciated that eventually an access request may be received from a host, which causes the vHRTD to be read from EOD. Examples of such subsequent access include data being appended from or near the EOD data set being accessed as a result of the host requested access. Until such an access request is received, the vHRTD remains unread, slowing host requested accesses during the intervening period. However, once an access is received which causes the vHRTD to be read, subsequent repositions can be executed at high speed using vHRTD.

Figure 7:
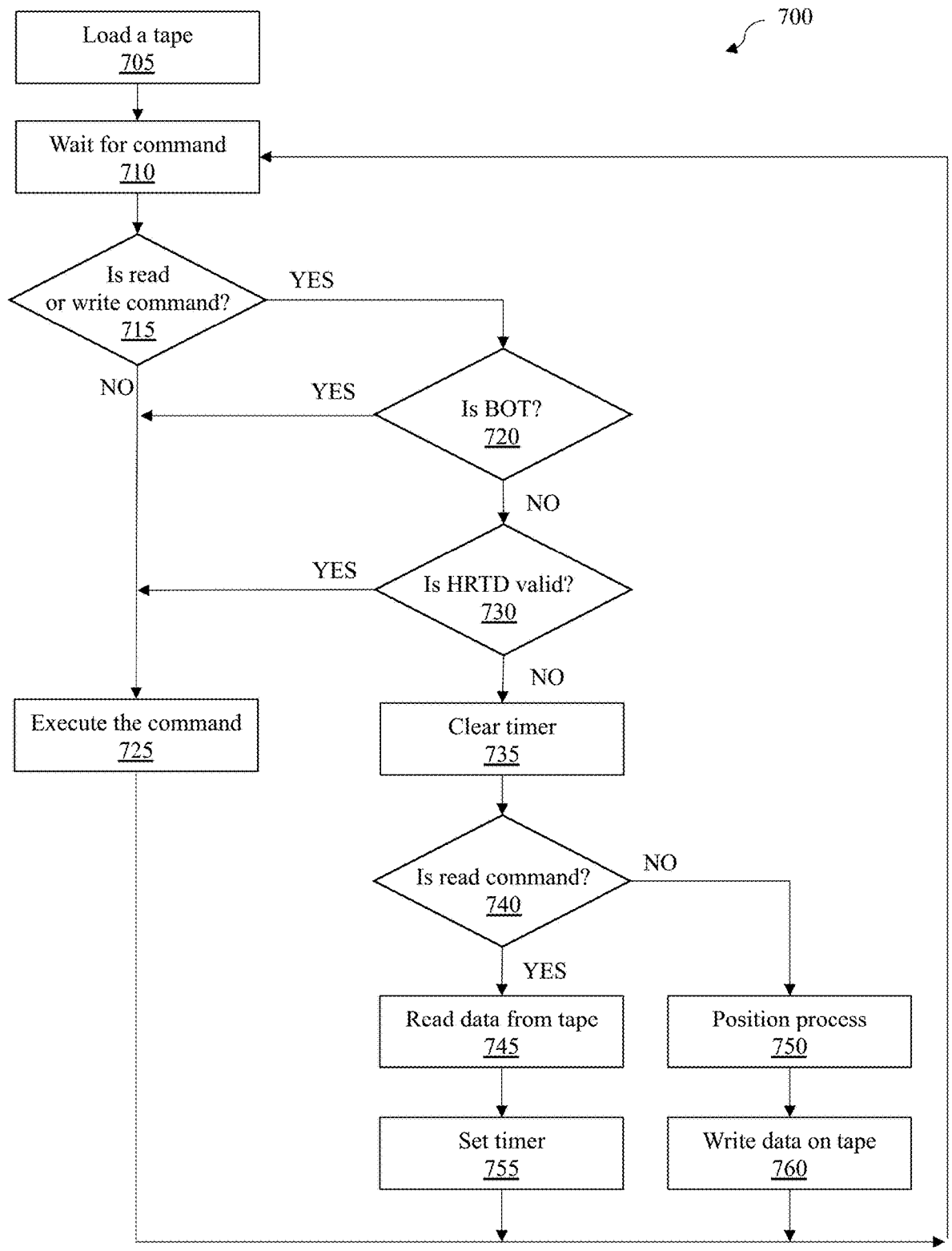
FIG. 7 illustrates an example process diagram of operations of a computer system employing an aspect of reposition management in accordance with the present disclosure.

Referring now to FIG. 7, shown is an example process diagram 700 of operations of a computer system employing an aspect of reposition management in accordance with the present disclosure. In this embodiment, the tape reposition management 255 (FIG. 2) and the tape reposition logic 257 and tape cartridge control unit (FIG. 3) controlled by the tape reposition management 255, are configured to perform the process 700 operations of FIG. 7. However, it is appreciated that other logic may be configured to perform the operations, depending upon the particular application.

In an embodiment, a tape cartridge such as the tape cartridge 302, FIGS. 3, 6, may be loaded into a tape drive such as the tape drive 231, FIG. 3, by automatic devices. In some embodiments, the tape cartridge may be loaded manually by a user and may employ a suitable user interface of the tape reposition management 255 or may be loaded through a combination of automatic and manual operations.

In embodiments, the process 700 begins by detecting the loading of a tape cartridge into the tape drive system and determining whether the cartridge being loaded is compatible with known high resolution tape directories such as the HRTD type tape cartridges. This is shown at step 705. In one embodiment, tape loading operations may be activated automatically through the tape reposition management 255 or units controlled by the tape reposition management 255. In other embodiments, the tape loading or mounting operations may be activated manually through a suitable user interface of the tape reposition management 255 or may be activated through a combination of automatic and manual operations.

In some embodiments, the tape reposition management 255 attempts to read sHKDS during loading of the tape. If readable, the HRTD is acquired and validated.

Once the tape is detected/loaded in the tape drive, the process 700 continues by waiting for a command from a host. This is shown at step 710. The tape reposition management 255 will wait for a command from the host. If the command is neither a read or a write command, "NO" at step 715, the process 700 continues by executing the command. This is shown at step 725. For example, a reposition command (e.g., locate command or space command) may be received and executed by the tape reposition management 255.

If the command is a read or a write command, "YES" at step 715, the process 700 continues by determining if the current position is at the beginning of the tape (BOT). This is shown at step 720. If the current position is at the BOT position, "YES" at step 720, then the process 700 continues to step 725 where the read or write command is executed. If the current position is not at the BOT, "NO" at step 720, the process 700 continues by attempting to read and validate the HRTD. This is shown at step 730.

If the HRTD is readable and validated, "YES" at step 730, then the process 700 continues to step 725 and the read or write command is executed. If the HRTD is not readable/valid, "NO" at step 730, then the process 700 continues by clearing a timer. This is shown at step 735. In embodiments, a timer is used as a trigger for HRTD recovery. Typically, once a series of commands (processes from repositioning to reading or writing necessary data) are carried out, the HRTD may be recovered at any time. As a means of distinguishing breaks among the series of processes, the timer is used. Because applications perform a series of processes continuously, there is almost no break among the commands. By allowing for reducing time loss of repositioning performed without using HRTD, as well as media damage caused by skimming, it is sufficient to set the timer to around 10 seconds, which has been statistically calculated during performance testing described above.

The process 700 continues by determining if the command is a read command. This is shown at 740. If the command is a read command, "YES" at step 740, the process continues by reading data from the tape (shown at step 745) and setting a timer (shown at step 755). The timer may be set to a predetermined time limit (e.g., 10 seconds). Once set, the process 700 continues by returning to the command state at step 710 where it waits for a new command.

Figure 8:
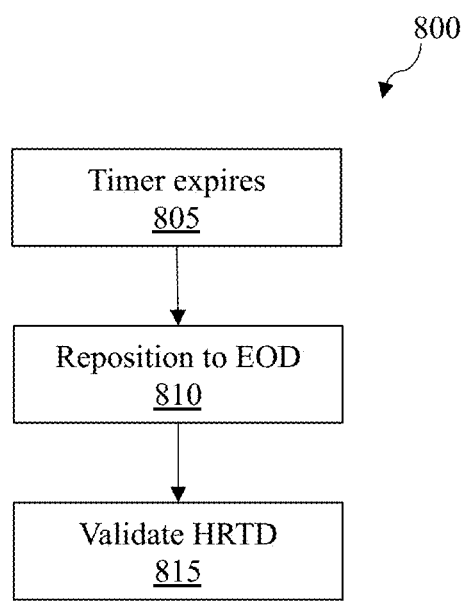
FIG. 8 illustrates an example process diagram of operations of a computer system employing an aspect of reposition management in accordance with the present disclosure.

Referring now to FIG. 8, shown is an example process diagram 800 of operations of a computer system employing an aspect of reposition management in accordance with the present disclosure. In some embodiments, the process 700 may include process or sub-process 800 as shown in FIG. 8.

Process 800 begins when the predetermined time limit that was set for the timer (at step 755) expires. This is shown at step 805. Once the predetermined time limit expires, process 800 continues by repositioning the tape drive to the EOD. This is shown at step 810. The process 800 continues by reading and validating the HRTD. This is shown at step 815.

Returning to FIG. 7, if the command is not a read command, "NO" at step 740, then the process 700 continues by implementing a reposition process. This is shown at step 750. Once the reposition process has been completed, the process 700 continues by writing data on the tape. This is shown at step 760. Once the data is written on the tape, the process returns to the command state at step 710 where the tape drive waits for a new command.

Figure 9:
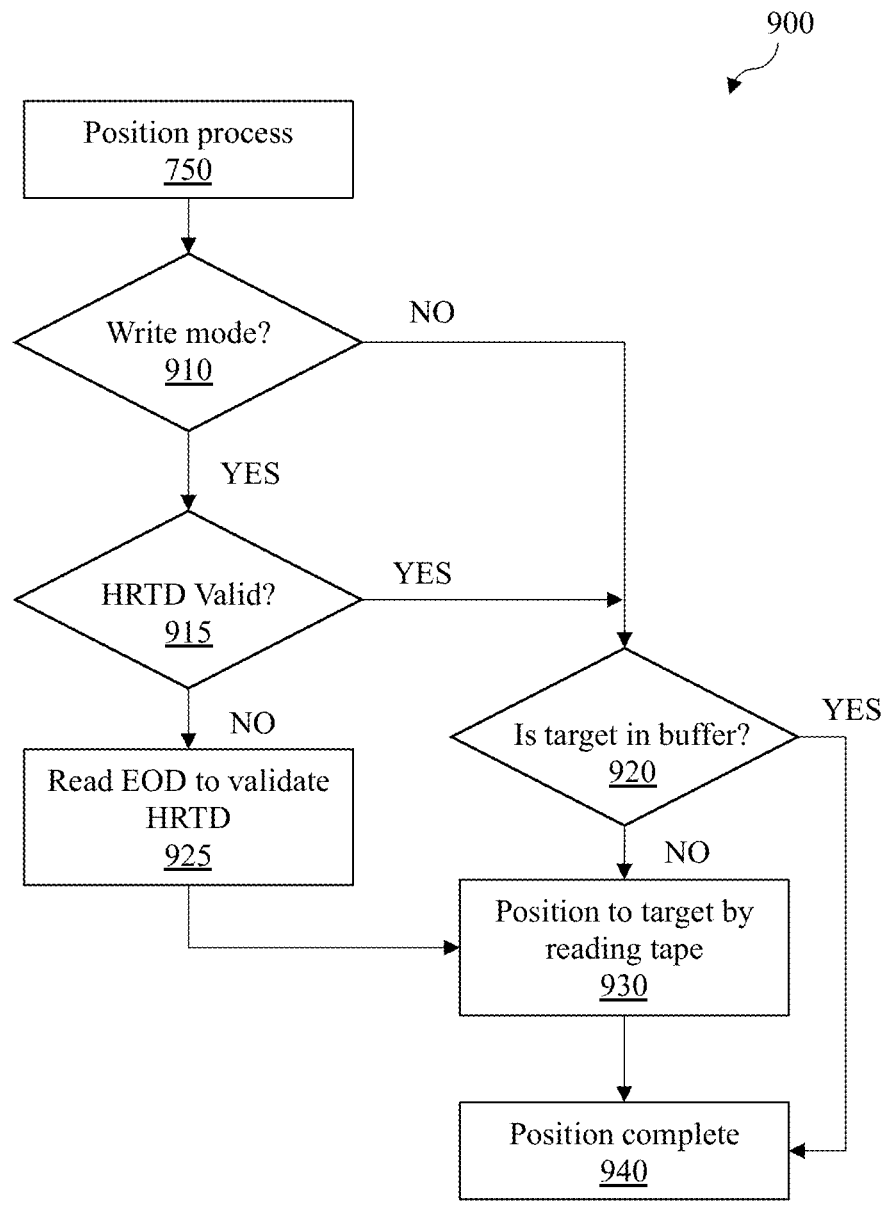
FIG. 9 illustrates an example process diagram of operations of a computer system employing an aspect of reposition management in accordance with the present disclosure.

Referring now to FIG. 9, shown is an example process diagram 900 of operations of a computer system employing an aspect of reposition management in accordance with the present disclosure. In some embodiments, process 700 may include process or sub-process 900 as shown in FIG. 9. Process 900 may include as additional or sub-steps to reposition process step 750. For conventional repositioning steps, when a record targeted for repositioning has already been read out of the tape and recorded in a segment buffer, the position process has already been completed. Only when there is no target record in the segment buffer does the tape drive move to the location of the data set in which the target is recorded and read out of the tape. As shown in process 900, when the HRTD is invalid in write mode, the tape drive reads EOD, validates the HRTD, and then moves to the location of the data set in which the target is recorded, prior to writing. In this way, even if the target is recorded in the segment buffer, when the tape drive moves to the EOD location and reads EOD, information about the segment recording the target stored in the buffer becomes invalid. These steps are further described below.

Process 900 begins by determining if the tape drive is in write mode. This is shown at step 910. If the tape drive is in write mode, "YES" at 910, the process 900 continues by determining if the HRTD is valid. This is shown at step 915. If the HRTD is unreadable or invalid, the process 900 continues by reading EOD to validate the HRTD. This is shown at step 925. The process 900 continues by repositioning to the location of the data set in which the target is recorded prior to writing. This is shown at step 930. Once repositioned, the process 900 continues where the position process has been completed. This is shown at 940.

Returning to step 910, if the tape drive is not in write mode, "NO" at step 910, the process 900 continues by determining if a record targeted for repositioning has already been read out from the tape and recorded in a segment buffer. This is shown at step 920. If the record targeted for repositioning has been read and recorded in the segment buffer, "YES" at 920, the process 900 continues where the position process has been completed. This is shown at step 940.

If the record targeted for reposition is not in the segment buffer, "NO" at step 920, the process 900 continues by repositioning to the location of the data set in which the target is recorded and the target is read out of the tape. This is shown at step 930.

Returning to step 915, if the HRTD is valid, "YES" at step 915, then the process 900 continues by determining if a record targeted for repositioning has already been read out from the tape and recorded in a segment buffer as described above at step 920.

Figure 10:
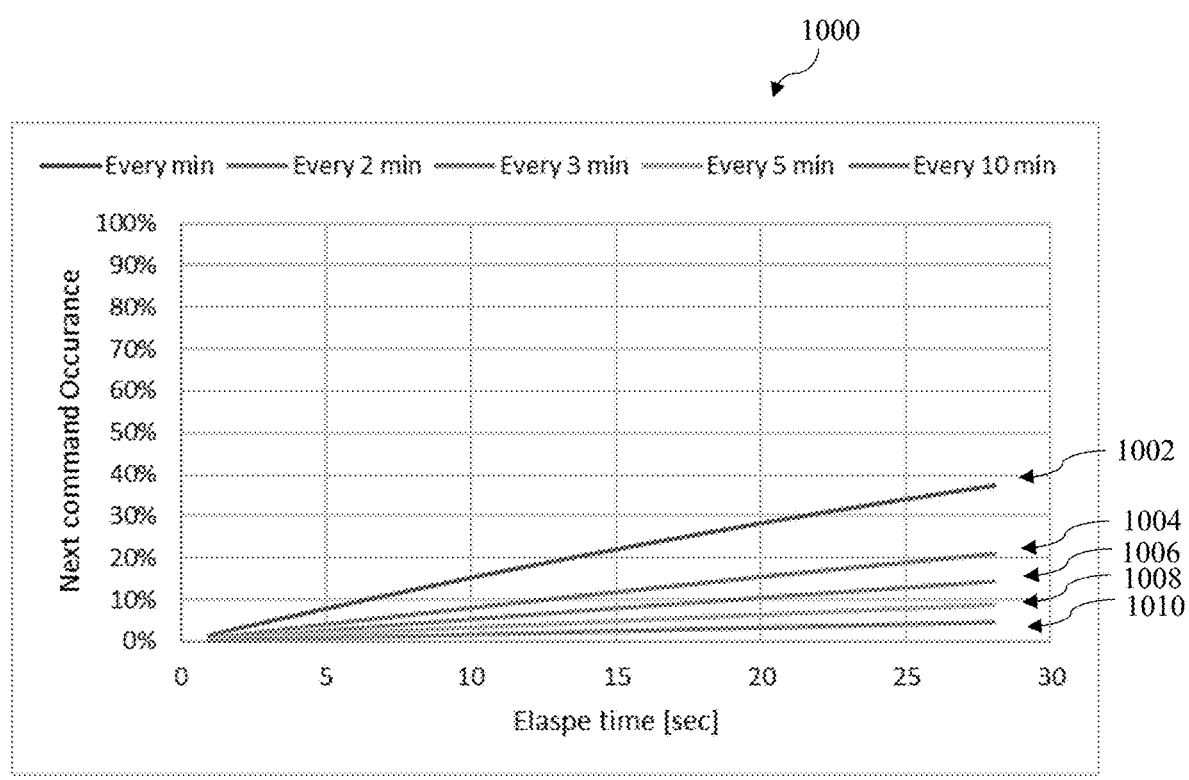
FIG. 10 illustrates an example graph of the probability of next command occurrence for reposition command intervals, in accordance with embodiments of the present disclosure.

Referring now to FIG. 10, shown an example graph 1000 of the probability of next command occurrence for reposition command intervals, in accordance with embodiments of the present disclosure. It is known that if there is an event that occurs λ times on average in a fixed period, the period X from when the event occurs once to when the event occurs the next time follows an exponential distribution. A probability density function f(x) of the exponential distribution whereby the period X until the event occurs the next time is X=x is given by:

$$f(x) = \begin{cases} \lambda e^{-\lambda x} & x \geq 0 \\ 0 & x > 0 \end{cases}$$

A cumulative distribution function F(x) is given by the following expression using the probability density function f(x):

$$F(x)=\int_{-\infty}^{x} f(t)dt = \int_{0}^{x} \lambda e^{-\lambda t} dt = 1 - e^{-\lambda x}$$

That is, if X denotes the period until the event that occurs λ times on average in a fixed period occurs the next time, the probability that the period X will become equal to or smaller than x is 1-e-λx. Conversely, the probability that the period X will become larger than x (i.e., the event will not occur until x elapses) is e-Ax. If the tape drive moves to EOD to recover the HRTD when x elapses after a reposition command is generated, the probability that the next reposition command will not be generated until y elapses will be calculated. The probability that the next Reposition command will not be generated in the first period x is e-λx, the probability that the next Reposition command will not be generated in the period of x+y is e(-λ(x+y)), and the probability that the next Reposition command will not be generated in the first period x and moreover in the next period y is:

$$\frac{e^{-\lambda(x+y)}}{e^{-\lambda x}} = e^{(-\lambda(x+y)-(-\lambda x))} = e^{-\lambda y}$$

This means that the probability of generation of the next command depends solely on the elapsed time y from when the drive starts moving to EOD, without relying on a timer setting x after issuance of a command. This ensures that HRTD recovery can be performed at any time once the processing of the series of commands is finished.

As described above, HRTD recovery takes 28.21 seconds. When the Reposition command is generated 60 times per hour on average (about once in 1 minute—1002), 30 times (about once in 2 minutes—1004), 20 times (about once in 3 minutes —1006), 12 times (about once in 5 minutes —1008), and 6 times (once in 10 minutes —1010), the probability that the next reposition command will be generated within 28 seconds taken to recover HRTD is shown in FIG. 10. Because α=2.57 seconds are reduced per reposition command, if the next reposition command is not generated within 2.57×2=5.14 seconds after generation of the first reposition command, reposition using the conventional method wastes more time than HRTD recovery. As shown in FIG. 10, the probability that the next reposition command is generated until 5.14 seconds elapse is 8.2% if a reposition command is generated about once in 1 minute (1002), 4.2% if a reposition command is generated about once in 2 minutes (1004), 1.7% if a reposition command is generated about once in 5 minutes (1008), and 0.9% if a reposition command is generated about once in 10 minutes (1010).

Figure 11:
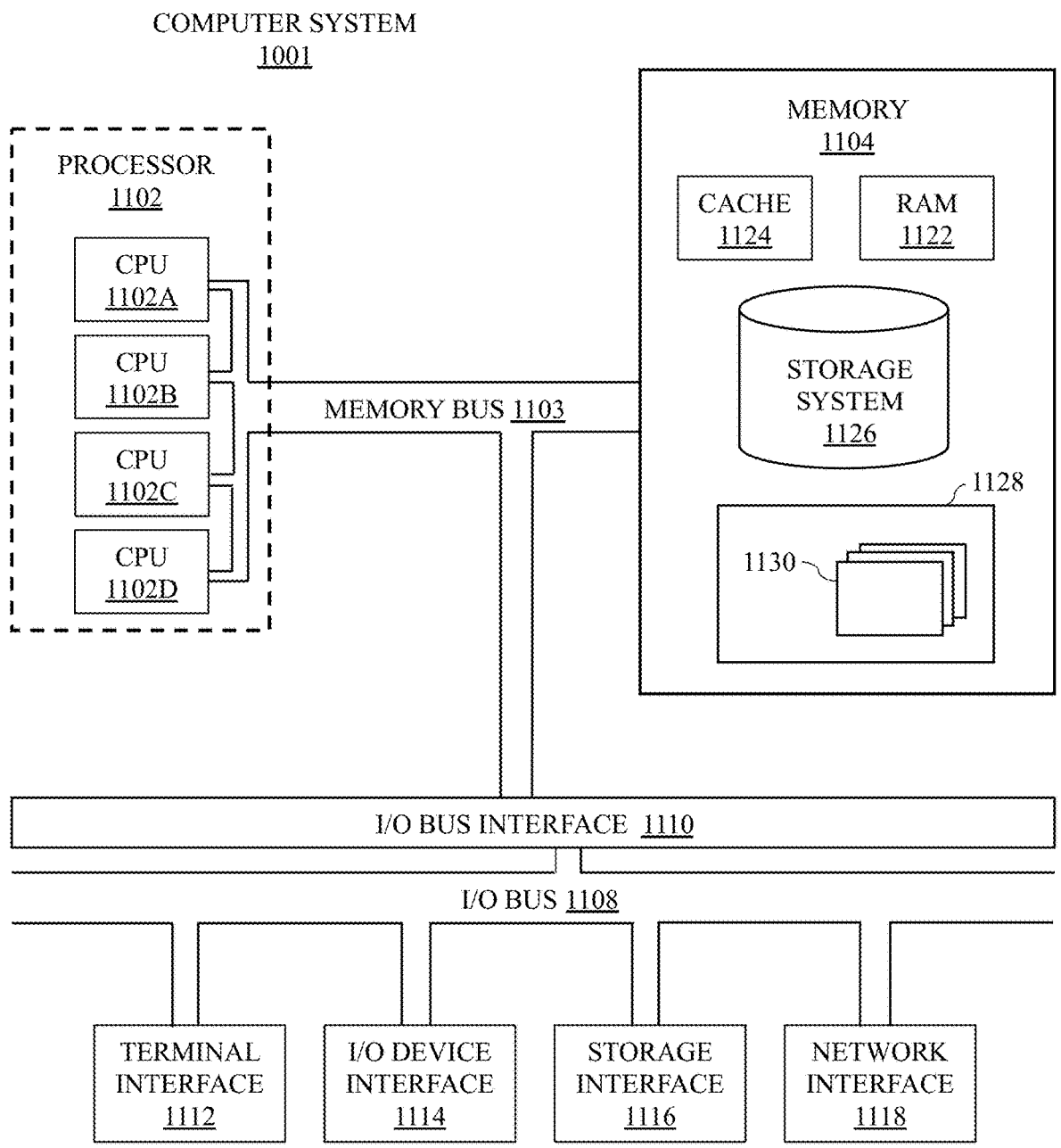
FIG. 11 illustrates a high-level block diagram of an example computer system that may be used in implementing one or more of the methods, tools, and modules, and any related functions, described herein, in accordance with embodiments of the present disclosure.

Referring now to FIG. 11, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 700, 800, and 900 as described in FIG. 7, FIG. 8, and FIG. 9, respectively). In some embodiments, the computer system 1101 may be configured as control storage controller 228 of FIG. 2 and/or control unit 302 of FIG. 3.

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 11 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 11 is intended to depict the representative major components of an exemplary computer system 1101. In some embodiments, however, individual components may have greater or lesser complexity than as represented in FIG. 11, components other than or in addition to those shown in FIG. 11 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pitslands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 12:
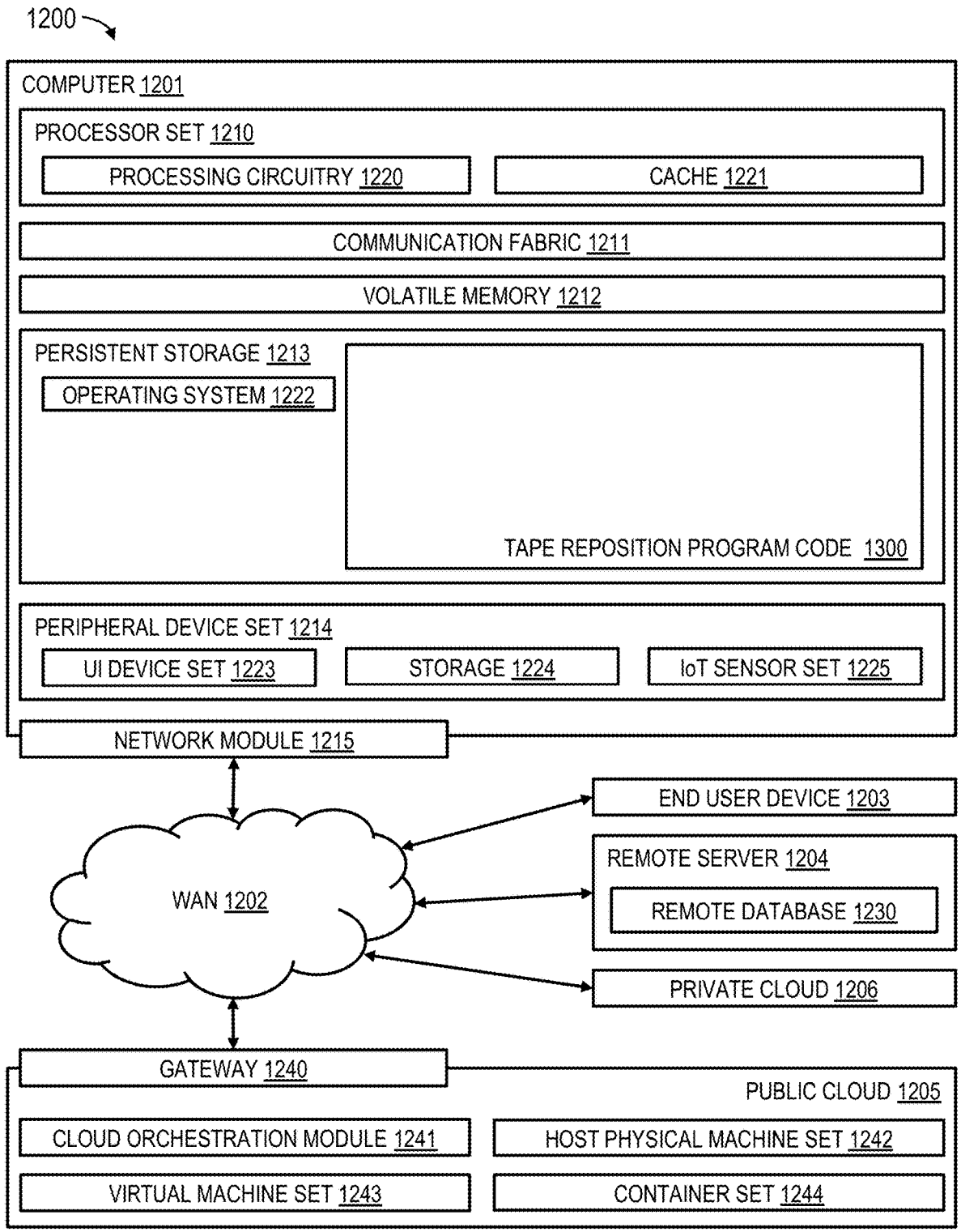
FIG. 12 depicts a schematic diagram of a computing environment for executing program code related to the methods disclosed herein and for minimizing HRTD recovery time in tape drive systems, according to at least one embodiment.

Embodiments of the present disclosure may be implemented together with virtually any type of computer, regardless of the platform is suitable for storing and/or executing program code. FIG. 12 shows, as an example, a computing environment 1200 (e.g., cloud computing system) suitable for executing program code related to the methods disclosed herein and for minimizing HRTD recovery time in tape drive storage systems. In some embodiments, the computing environment 1200 may be the same as or an implementation of the computing environment 100 and/or 200 of FIG. 1 and FIG. 2, respectively.

Computing environment 1200 contains an example of an environment for the execution of at least some of the computer code involved in performing the inventive methods, such as tape reposition program code 1300. The tape reposition program code 1300 may be a code-based implementation of the enterprise computer system 100. In addition to tape reposition program code 1300, computing environment 1200 includes, for example, a computer 1201, a wide area network (WAN) 1202, an end user device (EUD) 1203, a remote server 1204, a public cloud 1205, and a private cloud 1206. In this embodiment, the computer 1201 includes a processor set 1210 (including processing circuitry 1220 and a cache 1221), a communication fabric 1211, a volatile memory 1212, a persistent storage 1213 (including operating a system 1222 and the tape reposition program code 1300, as identified above), a peripheral device set 1214 (including a user interface (UI) device set 1223, storage 1224, and an Internet of Things (IoT) sensor set 1225), and a network module 1215. The remote server 1204 includes a remote database 1230. The public cloud 1205 includes a gateway 1240, a cloud orchestration module 1241, a host physical machine set 1242, a virtual machine set 1243, and a container set 1244.

The computer 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 1230. As is well understood in the art of computer technology, and depending upon the technology, performance of a computer-implemented method may be distributed among multiple computers and/or between multiple locations. On the other hand, in this presentation of the computing environment 1200, detailed discussion is focused on a single computer, specifically the computer 1201, to keep the presentation as simple as possible. The computer 1201 may be located in a cloud, even though it is not shown in a cloud in FIG. 12. On the other hand, the computer 1201 is not required to be in a cloud except to any extent as may be affirmatively indicated.

The processor set 1210 includes one, or more, computer processors of any type now known or to be developed in the future. The processing circuitry 1220 may be distributed over multiple packages, for example, multiple, coordinated integrated circuit chips. The processing circuitry 1220 may implement multiple processor threads and/or multiple processor cores. The cache 1221 is memory that is located in the processor chip package(s) and is typically used for data or code that should be available for rapid access by the threads or cores running on the processor set 1210. Cache memories are typically organized into multiple levels depending upon relative proximity to the processing circuitry. Alternatively, some, or all, of the cache for the processor set may be located "off chip." In some computing environments, the processor set 1210 may be designed for working with qubits and performing quantum computing.

Computer readable program instructions are typically loaded onto the computer 1201 to cause a series of operational steps to be performed by the processor set 1210 of the computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 1221 and the other storage media discussed below. The program instructions, and associated data, are accessed by the processor set 1210 to control and direct performance of the inventive methods. In the computing environment 1200, at least some of the instructions for performing the inventive methods may be stored in the tape reposition program code 1300 in the persistent storage 1213.

The communication fabric 1211 is the signal conduction path that allows the various components of the computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 1212 is any type of volatile memory now known or to be developed in the future. Examples include dynamic type random access memory (RAM) or static type RAM. Typically, the volatile memory 1212 is characterized by random access, but this is not required unless affirmatively indicated. In the computer 1201, the volatile memory 1212 is located in a single package and is internal to the computer 1201, but, alternatively or additionally, the volatile memory may be distributed over multiple packages and/or located externally with respect to the computer 1201.

The persistent storage 1213 is any form of non-volatile storage for computers that is now known or to be developed in the future. The non-volatility of this storage means that the stored data is maintained regardless of whether power is being supplied to the computer 1201 and/or directly to the persistent storage 1213. The persistent storage 1213 may be a read only memory (ROM), but typically at least a portion of the persistent storage allows writing of data, deletion of data and re-writing of data. Some familiar forms of persistent storage include magnetic disks and solid state storage devices. The operating system 1222 may take several forms, such as various known proprietary operating systems or open source Portable Operating System Interface-type operating systems that employ a kernel. The code included in the tape reposition program code 1300 typically includes at least some of the computer code involved in performing the inventive methods.

The peripheral device set 1214 includes the set of peripheral devices of the computer 1201. Data communication connections between the peripheral devices and the other components of the computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 1223 may include components such as a display screen, speaker, microphone, wearable devices (such as goggles and smart watches), keyboard, mouse, printer, touchpad, game controllers, and haptic devices. The storage 1224 is external storage, such as an external hard drive, or insertable storage, such as an SD card. The storage 1224 may be persistent and/or volatile. In some embodiments, the storage 1224 may take the form of a quantum computing storage device for storing data in the form of qubits. In embodiments where the computer 1201 is required to have a large amount of storage (for example, where the computer 1201 locally stores and manages a large database) then this storage may be provided by peripheral storage devices designed for storing very large amounts of data, such as a storage area network (SAN) that is shared by multiple, geographically distributed computers. The IoT sensor set 1225 is made up of sensors that can be used in Internet of Things applications. For example, one sensor may be a thermometer and another sensor may be a motion detector.

The network module 1215 is the collection of computer software, hardware, and firmware that allows the computer 1201 to communicate with other computers through the WAN 1202. The network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 1215 are performed on the same physical hardware device. In other embodiments (for example, embodiments that utilize software-defined networking (SDN)), the control functions and the forwarding functions of the network module 1215 are performed on physically separate devices, such that the control functions manage several different network hardware devices. Computer readable program instructions for performing the inventive methods can typically be downloaded to the computer 1201 from an external computer or external storage device through a network adapter card or network interface included in the network module 1215.

The WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 1203 is any computer system that is used and controlled by an end user (for example, a customer of an enterprise that operates the computer 1201) and may take any of the forms discussed above in connection with the computer 1201. The EUD 1203 typically receives helpful and useful data from the operations of the computer 1201. For example, in a hypothetical case where the computer 1201 is designed to provide a recommendation to an end user, this recommendation would typically be communicated from the network module 1215 of the computer 1201 through the WAN 1202 to the EUD 1203. In this way, the EUD 1203 can display, or otherwise present, the recommendation to an end user. In some embodiments, the EUD 1203 may be a client device, such as thin client, heavy client, mainframe computer, desktop computer and so on.

The remote server 1204 is any computer system that serves at least some data and/or functionality to the computer 1201. The remote server 1204 may be controlled and used by the same entity that operates computer 1201. The remote server 1204 represents the machine(s) that collect and store helpful and useful data for use by other computers, such as the computer 1201. For example, in a hypothetical case where the computer 1201 is designed and programmed to provide a recommendation based on historical data, then this historical data may be provided to the computer 1201 from the remote database 1230 of the remote server 1204.

The public cloud 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 1205 is performed by the computer hardware and/or software of the cloud orchestration module 1241. The computing resources provided by the public cloud 1205 are typically implemented by virtual computing environments that run on various computers making up the computers of the host physical machine set 1242, which is the universe of physical computers in and/or available to the public cloud 1205. The virtual computing environments (VCEs) typically take the form of virtual machines from the virtual machine set 1243 and/or containers from the container set 1244. It is understood that these VCEs may be stored as images and may be transferred among and between the various physical machine hosts, either as images or after instantiation of the VCE. The cloud orchestration module 1241 manages the transfer and storage of images, deploys new instantiations of VCEs and manages active instantiations of VCE deployments. The gateway 1240 is the collection of computer software, hardware, and firmware that allows the public cloud 1205 to communicate through the WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 1206 is similar to the public cloud 1205, except that the computing resources are only available for use by a single enterprise. While the private cloud 1206 is depicted as being in communication with the WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 1205 and the private cloud 1206 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. In some embodiments, one or more of the operating system 1222 and the tape reposition program code 1300 may be implemented as service models. The service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A method for minimizing high resolution tape directory (HRTD) recovery time when a HRTD is invalid, wherein the method is performed by a tape drive, the method comprising:
    loading a tape in the tape drive;
    in response to receiving a write command or a read command at a beginning of tape (BOT) position, executing the write command or the read command without performing HRTD recovery;
    in response to receiving the write command or the read command at a position other than the BOT position, determining if the HRTD is valid; and
    in response to determining the HRTD is not valid, clearing a timer.

2. The method of claim 1, further comprising:
    in response to receiving the write command at the position other than the BOT position, repositioning to an end of data (EOD) position;
    reading the HRTD from the EOD position;
    validating the HRTD; and
    executing the write command.

3. The method of claim 1, further comprising:
    in response to receiving the read command at the position other than the BOT position, executing the read command; and
    setting a timer to a predetermined time limit if HRTD recovery is required after processing the read command.

4. The method of claim 3, further comprising:
in response to the predetermined time limit being reached, repositioning to an end of data (EOD) position;
reading the HRTD from the EOD position; and
validating the HRTD.

5. The method of claim 3, wherein the predetermined time limit is statistically calculated.

6. The method of claim 5, wherein the predetermined time limit is set to 10 seconds.

7. The method of claim 1, further comprising:
in response to the HRTD being invalid in write mode, repositioning to an end of data (EOD) position;
reading the HRTD from the EOD position;
validating the HRTD; and
repositioning to a target position by reading the tape.

8. A system for minimizing high resolution tape directory (HRTD) recovery time when a HRTD is invalid, the system comprising:
a processor; and
a computer-readable storage medium communicatively coupled to the processor of a tape drive and storing program instructions which, when executed by the processor, cause the processor of the tape drive to perform a method comprising:
loading a tape in the tape drive;
in response to receiving a write command or a read command at a beginning of tape (BOT) position, executing the write command or the read command without performing HRTD recovery;
in response to receiving the write command or the read command at a position other than the BOT position, determining if the HRTD is valid; and
in response to determining the HRTD is not valid, clearing a timer.

9. The system of claim 8, wherein the method performed by the processor of the tape drive further comprises:
in response to receiving the write command at the position other than the BOT position, repositioning to an end of data (EOD) position;
reading the HRTD from the EOD position;
validating the HRTD; and
executing the write command.

10. The system of claim 8, wherein the method performed by the processor of the tape drive further comprises:
in response to receiving the read command at the position other than the BOT position, executing the read command; and
setting a timer to a predetermined time limit if HRTD recovery is required after processing the read command.

11. The system of claim 10, wherein the method performed by the processor of the tape drive further comprises:
in response to the predetermined time limit being reached, repositioning to an end of data (EOD) position;
reading the HRTD from the EOD position; and
validating the HRTD.

12. The system of claim 10, wherein the predetermined time limit is statistically calculated.

13. The system of claim 8, wherein the method performed by the processor of the tape drive further comprises:
in response to the HRTD being invalid in write mode, repositioning to an end of data (EOD) position;
reading the HRTD from the EOD position;
validating the HRTD; and
repositioning to a target position by reading the tape.

14. A computer program product comprising a computer-readable storage medium having program instructions embodied therewith, the program instructions executable by a processor of a tape drive to cause the processor to perform a method for minimizing high resolution tape directory (HRTD) recovery time when a HRTD is invalid, the method comprising:
loading a tape in the tape drive;
in response to receiving a write command or a read command at a beginning of tape (BOT) position, executing the write command or the read command without performing HRTD recovery;
in response to receiving the write command or the read command at a position other than the BOT position, determining if the HRTD is valid; and
in response to determining the HRTD is not valid, clearing a timer.

15. The computer program product of claim 14, wherein the method performed by the processor of the tape drive further comprises:
in response to receiving the write command at the position other than the BOT position, repositioning to an end of data (EOD) position;
reading the HRTD from the EOD position;
validating the HRTD; and
executing the write command.

16. The computer program product of claim 14, wherein the method performed by the processor of the tape drive further comprises:
in response to receiving the read command at the position other than the BOT position, executing the read command; and
setting a timer to a predetermined time limit if HRTD recovery is required after processing the read command.

17. The computer program product of claim 16, wherein the method performed by the processor of the tape drive further comprises:
in response to the predetermined time limit being reached, repositioning to an end of data (EOD) position;
reading the HRTD from the EOD position; and
validating the HRTD.

18. The computer program product of claim 16, wherein the predetermined time limit is statistically calculated.

19. The computer program product of claim 18, wherein the predetermined time limit is 10 seconds.

20. The computer program product of claim 14, wherein the method performed by the processor of the tape drive further comprises:
in response to the HRTD being invalid in write mode, repositioning to an end of data (EOD) position;
reading the HRTD from the EOD position;
validating the HRTD; and
repositioning to a target position by reading the tape.

* * * * *